H. Stone.
Hermetic Sealing.

N° 80,234. Patented Jul. 21, 1868.

Witnesses;
J. H. Burridge
C. E. Waite

Inventor;
Hiram Stone

United States Patent Office.

HIRAM STONE, OF CLEVELAND, OHIO.

Letters Patent No. 80,234, dated July 21, 1868.

---

IMPROVED FRUIT-JAR.

---

*The Schedule referred to in these Letters Patent and making part of the same.*

---

TO ALL WHOM IT MAY CONCERN:

Be it known that I, HIRAM STONE, of Cleveland, in the county of Cuyahoga, and State of Ohio, have invented certain new and useful Improvements in Fruit-Jars, &c.; and I do hereby declare that the following is a full and complete description of the same, reference being had to the accompanying drawings, making a part of this specification, in which—

Like letters of reference refer to like parts in the views.

Figure 1:
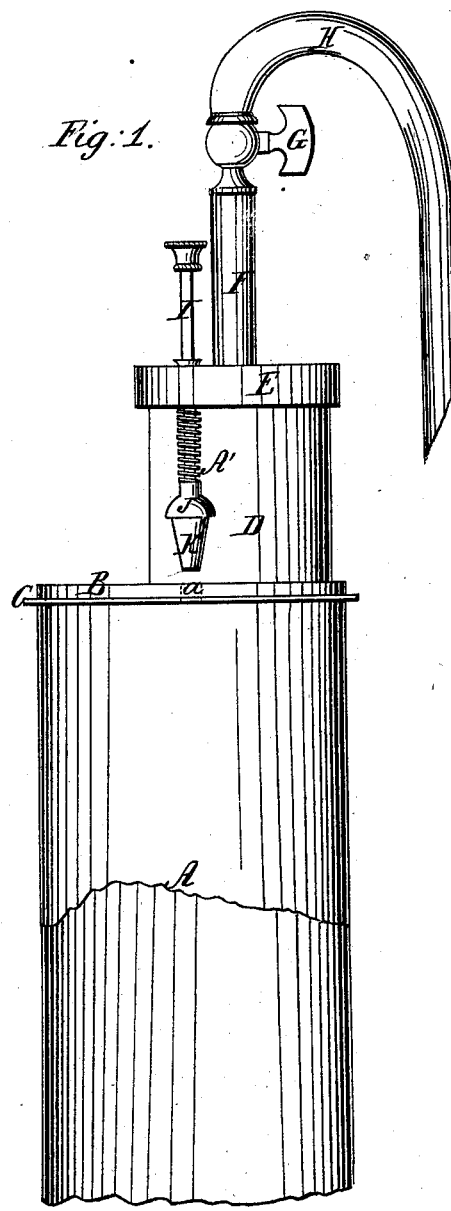
Figure 1 is a side view of the apparatus.
Figure 2:
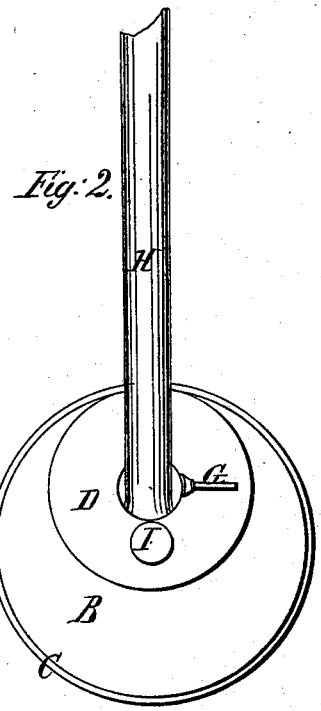
Figure 2 is a view of the top.

In fig. 1, A represents the jar in which the fruit is placed, and which may be constructed of any material, and of any desirable size or shape.

B is the cover, between which and the edge of the jar is interposed a gasket, C, of rubber, or other suitable material, whereby the said cover is made to fit air-tight.

D is an auxiliary jar, consisting of the same material, but much smaller, and is provided with a cover, E, so attached to the vessel, by being luted or otherwise, as to be air-tight. This jar is open at the bottom, and is placed upon the top of the jar A for operation, as shown in fig. 1.

F is a metallic tube, fixed in the top of said jar, and with which it communicates.

G is a stop-cock, and H a flexible tube, with which the jar is put in connection with the air-pump, as and for a purpose hereinafter shown.

I is a stem, penetrating the cover, the lower end of which is provided with a cup-shaped socket, J, in which is inserted a cork or stopple, K, or the stopple may be attached to the stem by any adhesive material, and thus dispense with the socket. Said stopple consists of rubber, or other air-impervious material, or an ordinary cork may be used and afterwards sealed.

A' is a coiled spring, surrounding the lower end of the stem, between the socket and cover, whereby the said socket and stem are retained in the position shown in the drawing. Said spring may be placed on the outside of the jar, or other means used for that purpose.

The practical purpose of the auxiliary jar and appendages is for exhausting the air from the jar A, in which the fruit or other articles for preservation have been placed, and which being done, stopping the same in a vacuum, thereby preventing the air from re-entering the vessel while being corked, and which is performed in the manner as follows, viz:

In the jar A, as before said, is placed the fruit or other articles, which is then closed by the cover B, resting upon the gasket C. On the cover is now placed the auxiliary jar, and in such position as to bring the end of the stopple K immediately over the hole a. The free end of the tube H is now attached to the air-pump, and thereby the air in the jar A is exhausted through the hole a and auxiliary jar. The vacuum thus obtained in the two jars is secured by the stop-cock G. When the air is thus exhausted, the stopple K is then forced into the hole a by pressing down upon the stem I, which drives it into the hole, and thereby becomes dislodged from the socket, and thus stops the hole permanently and air-tight. At the same time the external pressure of the air upon the cover forces it in close contact with the soft, yielding gasket laid between it and the edge of the jar, whereby the cover is made tight, and thus excludes the air from the vacuum in which the fruit is kept. The auxiliary jar is now removed by letting in the air, by turning the stop-cock, thereby completing the hermetically sealing of the can or jar.

The metallic tube and stop-cock above described may be dispensed with, and the end of the flexible tube H provided with a thimble, over which it is drawn, inserted in an aperture in the cover. The stop-cock for retaining the vacuum while it is being formed, may be used in connection with the pump instead of the tube.

In this manner, exhausting the air from the jar, and sealing the same by the stopple and gasket, are easily and quickly performed, and insure perfect security to the fruit from the air, so that it may be kept from decay, sound, fresh, and with its original flavor.

I do not confine myself to any particular-shaped jar, or material of which they may be made, the application of the auxiliary jar being alike applicable to all kinds that may be used for the preservation of fruits or other articles.

Nor do I confine myself to any particular-sized or shaped auxiliary jar. This jar may be sufficiently large to cover the entire fruit or preserving-jar, and the same results obtained, viz, stopping the hole $a$ in a vacuum, and which may be done either by the stopple above described, or by the employment of a valve placed over the hole and pushed tightly down upon its seat by the stem.

What I claim as my invention, and desire to secure by Letters Patent, is—

1. The stem I and spring A', as arranged, in combination with the auxiliary jar D, in the manner and for the purpose set forth.

2. The stem I and auxiliary jar D, in combination with the jar A, for the purpose and in the manner substantially as set forth.

HIRAM STONE.

Witnesses:
    J. H. BURRIDGE,
    K. COON.